United States Patent [19]

Jaeger

[11] Patent Number: 4,608,597
[45] Date of Patent: Aug. 26, 1986

[54] METHOD FOR THE SURVEYANCE OF AN OBJECT SPACE

[75] Inventor: Walter Jaeger, Cureglia, Switzerland

[73] Assignee: GX-Holding AG, Basel, Switzerland

[21] Appl. No.: 629,543

[22] PCT Filed: Oct. 27, 1983

[86] PCT No.: PCT/CH83/00119
§ 371 Date: Jun. 29, 1984
§ 102(e) Date: Jun. 29, 1984

[87] PCT Pub. No.: WO84/01872
PCT Pub. Date: May 10, 1984

[30] Foreign Application Priority Data

Nov. 2, 1982 [CH] Switzerland ............. 6357/82

[51] Int. Cl.$^4$ .................................. H04N 7/18
[52] U.S. Cl. ......................... 358/113; 358/81; 358/108
[58] Field of Search .............. 358/113, 105, 81, 93, 358/108

[56] References Cited

U.S. PATENT DOCUMENTS 3,258,529  6/1966  Parrish ............... 358/113
3,475,608 10/1969  Pardes ............... 358/105
4,086,616  4/1978  Catano ............... 358/113
4,343,020  8/1982  Stapleton ............ 358/81

FOREIGN PATENT DOCUMENTS 1592870  6/1970  France .

Primary Examiner—Howard W. Britton
Attorney, Agent, or Firm—Spencer & Frank

[57] ABSTRACT

In order to clearly reveal modifications, even small alterations occurring in a controlled object space (1), the thermal infrared radiation of the object space (1) is represented by means of an infrared objective (2) on two different infrared detectors (3, 4; 3', 4') and having each different spectral selectivity characteristics. Those two representations are serially scanned to form two sequences of electrical signals (5, 5'). One of those signal sequences (5') is reproduced on a television monitor (7) directly in a predetermined color (8') and the reproduction of the other signal sequence (5) is delayed and is effected in another color (9').

8 Claims, 9 Drawing Figures

METHOD FOR THE SURVEYANCE OF AN OBJECT SPACE

The present invention relates to a method of monitoring a target space.

It is known that target spaces can be monitored by means of TV cameras sensitive to infrared (IR) radiation. This produces an image that is in accordance with the temperature differences and emission characteristics of the target space. In general, an image of this kind displays little contrast and is only moderately sharp. Small changes in the target space under surveillance are thus frequently missed by an observer.

It is an object of the present invention to provide a method which does not have these disadvantages, that is to say, in which even slight changes in the space under surveillance will be made distinct.

According to the present invention there is provided a method of monitoring a target space, comprising projecting thermal infrared radiation of the target space by means of an infrared lens on to at least one infrared sensitive detector, forming an electrical signal sequence by constant scanning, and passing this signal sequence in a specific colour directly to a colour TV monitor and delayed and in another colour to the same monitor as an image of the object.

In general, the objects in the target space differ from each other not only by different temperatures, but also in the different emission coefficients of their materials. Thus, it is advantageous to project the target space on two detectors having spectral sensitivity characteristics that differ from each other, one of these detectors being sensitive to IR radiation, and then repeatedly to scan the images so produced so as to form two signal sequences, and subsequently to transmit one of these signal sequences directly and in a specific colour, the other delayed and in another colour, to a TV monitor.

In this connection, in order to render moving objects more distinct by means of a coloured outline, it is also advantageous if one transmits at least one of these signal sequences both directly and in a specific colour, as well as delayed, to a TV monitor.

It is advantageous to project the target space on at least one point, line or image-operating detector so that it is point, line or image filtered and to scan it in such a manner that point, line or image signal sequences result that correspond to two images having spectral sensitivity characteristics that differ from each other.

In order that the signal can be further processed by TV type systems that are commonly available it is desirable that TV type scanning be used, and at least one unit of line time.

In order to produce a stable image it is advantageous that a signal is displayed delayed by several units of line time.

In order that slow changes in the target space are rendered distinct it is further advantageous that a signal be displayed delayed by several half-image or image times.

The present invention will be described in more detail by way of example only, with reference to the accompanying drawings, in which.

Figure 1:
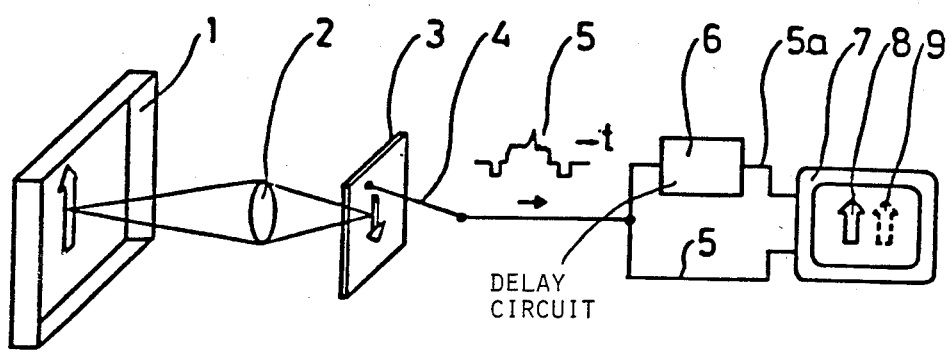
FIG. 1 is a schematic representation of a first embodiment for carrying out the method according to the present invention.

As can be seen from FIG. 1, the target space 1 is projected onto a display screen 3 by means of an IR lens 2. The display screen 3 is scanned repeatedly by line and by image in the manner of a TV, by means of a scanning system 4 so as to produce a signal sequence 5. The signal sequence 5 corresponds to a conversion of the geometrical image information into time information.

The time information 5 is transmitted, on the one hand, directly, and on the other hand through a delay circuit 6 to a two-colour TV monitor 7.

In this regard, a stable image 1 is reproduced in that the signal sequence 5 that is transmitted directly is reproduced as an image that overlaps the image that results from the signal sequence that is transmitted through the delay circuit 6. In principle, however, the two signal sequences are reproduced by two different signal sequences, and for this to the mixing of the two colour images for a stable image.

Conditions change as soon as a part of the image moves, since then the moving and the stationary parts display different colours since on the one hand the signal sequence transmitted directly, and on the other the signal sequence that is transmitted through the delay circuit 6 to the monitor 7 no longer overlap and this results in differently coloured images 8 and 9.

Figure 2:
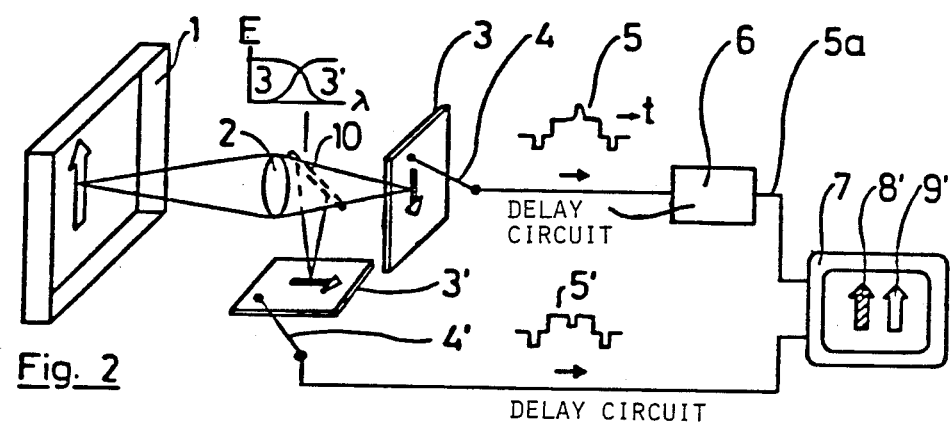
FIG. 2 is a schematic representation of a second embodiment for carrying out the method according to the present invention.
Figure 3:
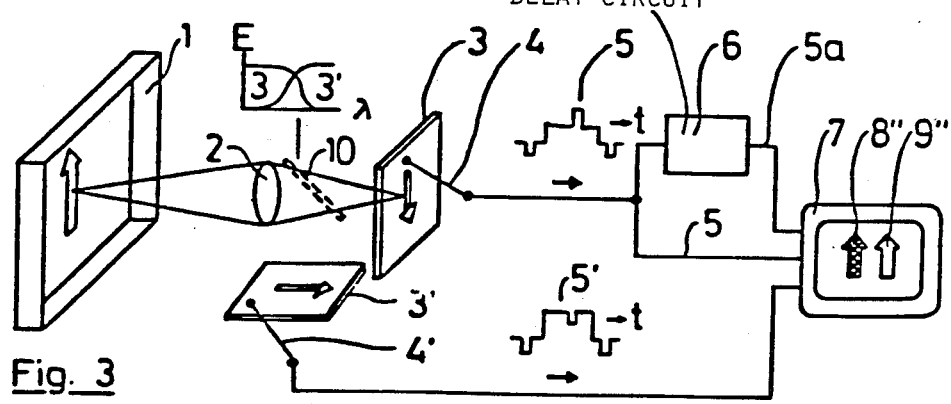
FIG. 3 is a schematic representation of a third embodiment for carrying out the method according to the present invention.

In FIGS. 2 and 3, the same identification numbers are used to identify the same components as in FIG. 1.

However, a spectral image division 10 is also provided for, and the effect of this is that the bundle of rays that produce the image 3 is split so that the images 3 and 3' correspond to different spectral ranges of the object radiation.

The images 3 and 3' corresponding to the two different spectral ranges are converted into two signal sequences 5 and 5' by the scanning systems 4 and 4'; signal sequence 5 is passed to the colour monitor 7 through the delay circuit 6 and signal sequence 5' is passed to the colour monitor 7 directly. The image 8' of a stationary object is changed by the splitting of the spectral range by means of the spectral image sectioning, in that now spectrally different radiating objects will be reproduced in different colours even if not moving. In addition, a moving object will be rendered distinct by a colour outline or by being differently coloured 9'.

In FIG. 3, unlike FIG. 2, the signal sequence 5 is not only delayed, but also transmitted directly and the signal sequences 5, 5' and 5a are reproduced as three different colours on the colour monitor 7. For this reason, the image appears without movement in colours that consist of two primary colours, each according to the spectral emission characteristics of the target space, and it appears in colours that consist of three primary colours as soon as there is any movement in the target space.

Figure 4:
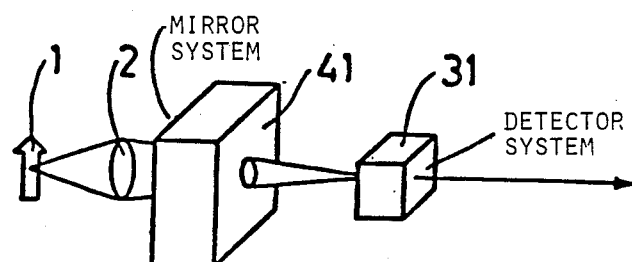
FIGS. 4 to 9 represent various combinations of IR sensitive detector with the associated scanning systems and possible filtering and picture sectioning systems.

FIG. 4 shows the use of a detector system 31 that reproduces a single image point. Image scanning is by means of a mirror system 41, and is carried out vertically and horizontally.

Figure 5:
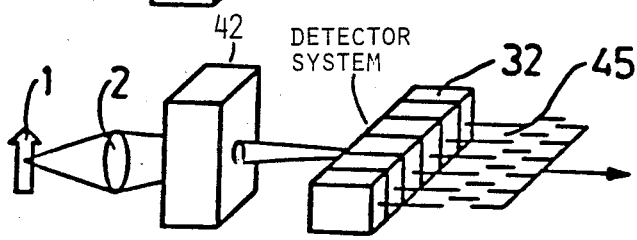

FIG. 5 shows a detector system 32 that consists of a plurality of individual elements, each having a corresponding switch 45, these corresponding for example to the image points per line. For this reason the scanning system 42 only operates vertically.

Figure 6:
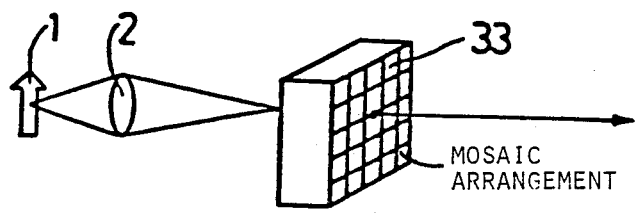

FIG. 6 shows a mosaic arrangement 33 of the detector elements and all the scanning is by electronic step switching.

Figure 7:
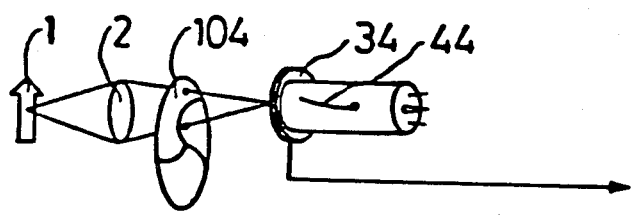

FIG. 7 shows a large-area detector element 34, for example, a pyrikon, scanning being by means of an electron beam. A rotating filter disc 104 serves as an image divider.

Figure 8:
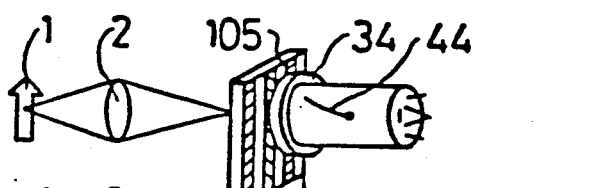

FIG. 8 shows an arrangement corresponding to FIG. 7, in which, however, the image divider has been replaced by a strip filter 105.

Figure 9:
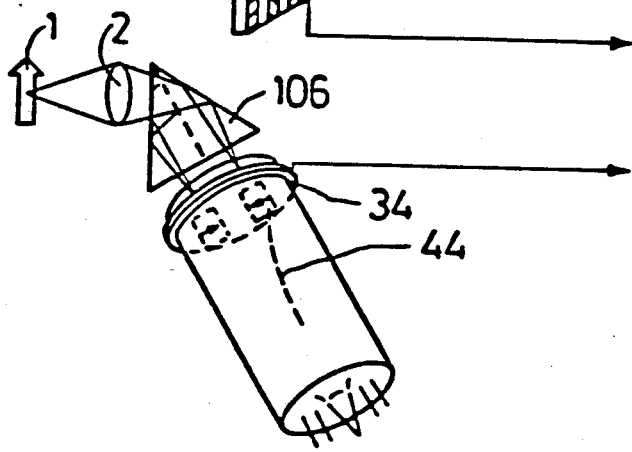

FIG. 9 shows an arrangement similarly to FIG. 7, in which, however, the image divider consists of a prism system 106 as described, for example, in Swiss Patent, No. 10615/79-8.

I claim:

1. A method of monitoring a target space, characterised by projecting thermal infrared radiation of the target space by means of an infrared lens on to at least one infrared sensitive detector, forming an electrical signal sequence by constant scanning and passing this signal sequence in a specific colour directly to a colour TV and delayed and in another colour to the same monitor as an image of the object.

2. A method as in claim 1, wherein the target space is projected on to two different detectors, which have different sensitivity characteristics, of which at least one is infrared sensitive, these images being scanned repeatedly so as to form two sequences of electrical signals, these sequences then being displayed on the TV monitor, one sequence being transmitted directly in one specific colour, the other being delayed and transmitted in another colour.

3. A method according to claim 2, characterised by that at least one of these signal sequences is transmitted to the TV monitor, both direct and in a specific colour as well as delayed.

4. A method according to claim 1, characterised by that the target space is projected on a point, line or image operating infrared detector so as to be displayed point, line or image filtered and so scanned that point, line or image signal sequences result, these corresponding to at least two images that have spectral sensitivity characteristics that differ from each other.

5. A method according to claim 1, characterized in that TV type scanning is used, and that at least one signal sequence is reproduced delayed by at least one unit of line time.

6. A method according to claim 1, characterized in that a signal is reproduced delayed by several units of line time.

7. A method according to claim 1, characterised by that a signal is reproduced delayed by several units of half-picture or picture time.

8. A method as in claim 1 wherein: the scanning during said step of forming is a line scanning; in the monitor the image is formed by line scanning; and the delay imparted to the signal sequence is equal to an integral multiple of one line scanning period.

* * * * *